US009119380B1

(12) United States Patent
Hendrickson

(10) Patent No.: US 9,119,380 B1
(45) Date of Patent: Sep. 1, 2015

(54) CHILD SAFETY TETHER WITH ATTACHMENT POUCH

(71) Applicant: Richard E Hendrickson, Huntington Station, NY (US)

(72) Inventor: Richard E Hendrickson, Huntington Station, NY (US)

( * ) Notice: Subject to any disclaimer, the term of this patent is extended or adjusted under 35 U.S.C. 154(b) by 0 days.

(21) Appl. No.: 14/617,712

(22) Filed: Feb. 9, 2015

Related U.S. Application Data

(60) Provisional application No. 61/938,592, filed on Feb. 11, 2014.

(51) Int. Cl.
A62B 35/00 (2006.01)
A01K 27/00 (2006.01)
A47D 13/08 (2006.01)

(52) U.S. Cl.
CPC ............ A01K 27/008 (2013.01); A01K 27/003 (2013.01); A47D 13/086 (2013.01)

(58) Field of Classification Search
CPC ... A47D 13/086; A01K 27/00; A01K 27/003; A01K 27/004; A01K 27/008
USPC ................................. 119/770, 769, 792, 798
See application file for complete search history.

(56) References Cited

U.S. PATENT DOCUMENTS

| | | | | | |
|---|---|---|---|---|---|
| 5,447,227 | A * | 9/1995 | Kosberg | ................. | 206/233 |
| 5,638,772 | A * | 6/1997 | Kaufmann et al. | ........... | 119/770 |
| 5,839,932 | A * | 11/1998 | Pierce et al. | .................... | 441/80 |
| D408,598 | S * | 4/1999 | Martell | ................. | D30/153 |
| 6,257,473 | B1 * | 7/2001 | Ringelstetter | ................ | 224/675 |
| 6,314,917 | B1 * | 11/2001 | Ryan | .................. | 119/796 |
| 7,073,462 | B1 * | 7/2006 | Layman | ................. | 119/161 |
| 7,467,604 | B1 * | 12/2008 | Werner et al. | ................. | 119/770 |
| D603,605 | S * | 11/2009 | Dingman | ................... | D3/226 |
| 8,079,329 | B1 * | 12/2011 | Pujol et al. | ................... | 119/796 |
| 8,342,137 | B1 * | 1/2013 | Burkhardt | ................ | 119/792 |
| 8,360,202 | B1 * | 1/2013 | Woodard | ................... | 182/3 |
| 8,534,233 | B1 * | 9/2013 | Han et al. | ................... | 119/795 |
| D724,843 | S * | 3/2015 | Abbott | ................. | D3/301 |
| 2003/0111022 | A1 * | 6/2003 | Woolley et al. | ............... | 119/868 |
| 2004/0112303 | A1 * | 6/2004 | Moulton, III | ................ | 119/795 |
| 2006/0027187 | A1 * | 2/2006 | Nicastro | ................ | 119/770 |
| 2007/0125315 | A1 * | 6/2007 | Ginakes | ................ | 119/770 |
| 2008/0072844 | A1 * | 3/2008 | Konigsberg | .................. | 119/770 |
| 2010/0269763 | A1 * | 10/2010 | Kraft | .................. | 119/795 |
| 2011/0000440 | A1 * | 1/2011 | Mucerino et al. | ............. | 119/709 |
| 2011/0011504 | A1 * | 1/2011 | Steinbacher | ................ | 150/106 |
| 2011/0023793 | A1 * | 2/2011 | Marricle | ................ | 119/770 |
| 2014/0007818 | A1 * | 1/2014 | Cheng | ................ | 119/792 |

* cited by examiner

*Primary Examiner* — Monica Williams
*Assistant Examiner* — Richard G Davis
(74) *Attorney, Agent, or Firm* — Alfred M. Walker

(57) ABSTRACT

A child's safety tether with an attachment pouch provides for quick release of the stored child safety tether in situations where the child care provider must temporarily relinquish contact with the child's hand while using both adult hands to negotiate a commercial transaction. The pouch has a top openable compartment for storing a cell phone or other personal electronic device, with other necessary documents such as credit cards and drivers license cards providing an adult's photographic identification and/or signature replica. The pouch also has a lower openable compartment for storing the child safety tether, which is released downward upon opening a quick release fastener for the downward oriented lower compartment for the tether.

14 Claims, 5 Drawing Sheets

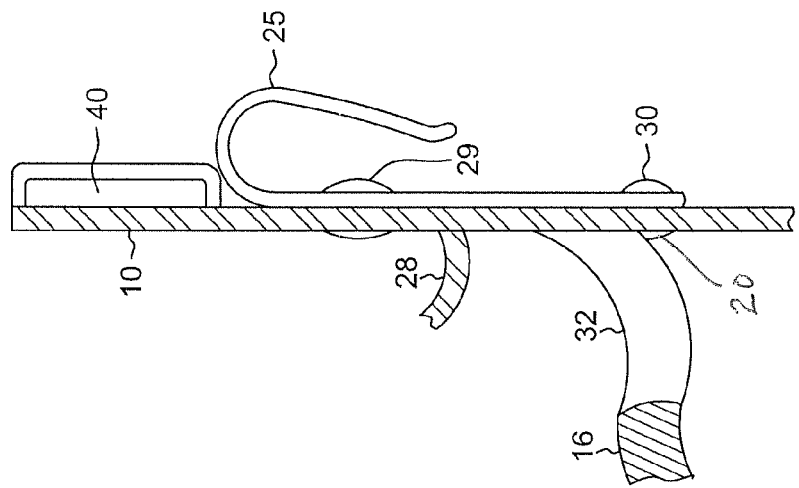
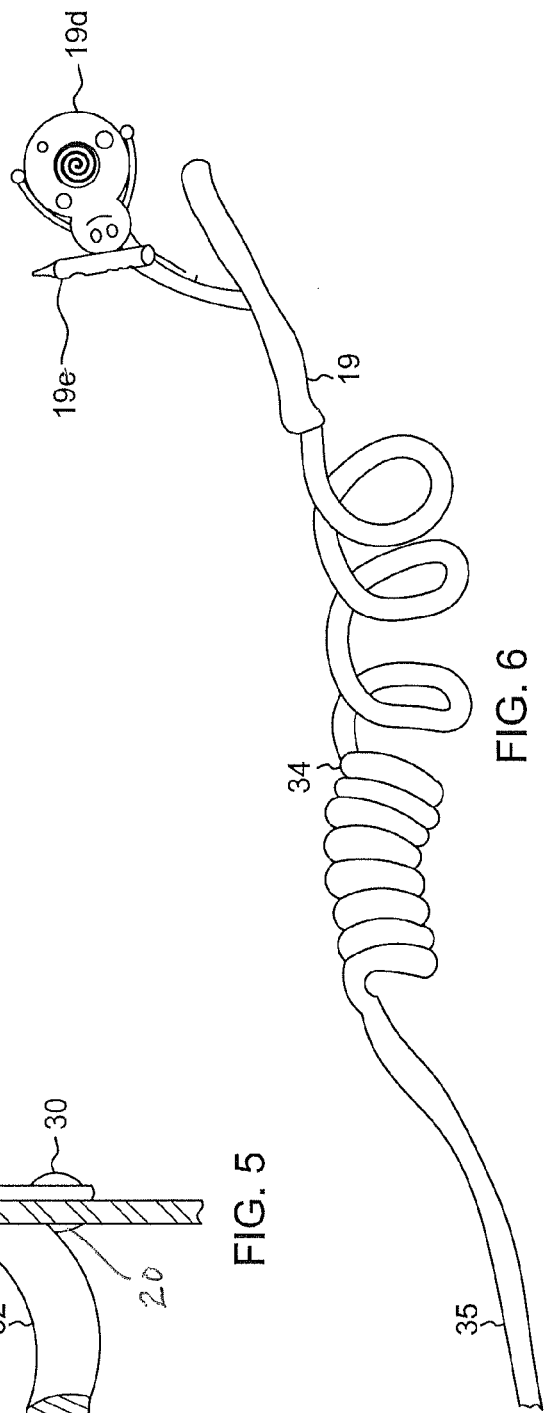

CHILD SAFETY TETHER WITH ATTACHMENT POUCH

RELATED APPLICATIONS

This application claims priority under 35 USC 119 (e) from provisional application Ser. No. 61/938,592, filed Feb. 11, 2014, which application is incorporated by reference herein.

FIELD OF THE INVENTION

The present invention relates to a pouch with a quick release of a stored child safety tether in situations where the child care provider must temporarily relinquish contact with the child's hand while using both adult hands to negotiate a commercial transaction.

BACKGROUND OF THE INVENTION

An adult is often multi-tasking by doing errands with a toddler in-tow. In some situations, it is difficult to keep track of the child especially while involved in activities requiring two hands. Examples of such situations include doing transactions at bank teller windows, post office, and ticket counters with typically high narrow counter tops. Often, the adult is tempted with the alternative of trying to carefully sit the squirming toddler on the high narrow surface. This invention is an aid for such situations with the objective of keeping the toddler safely at ground level at one's side for a short time period, and thereby precluding more dangerous alternatives.

The invention involves the use of a child tether as well as a pouch to store the tether when not in use. The prior art does teach the use of pouches for a variety of normally carried objects. The prior art is also replete with a variety of harnesses and tethers for children.

In particular, U.S. Design Pat. No. D619,356 of Hillman shows various views of a carrying case for mobile phone and credit cards. U.S. Design Pat. No. D602,689 of Hewitt discloses a combination wallet and cell phone case.

U.S. Pat. No. 4,667,624 of Smith is exemplary of the many patents over the years relating to safety harnesses for children. In Smith's patent, an inelastic strap attaches a child's harness to a hook on a waistband worn by an adult.

The prior art does not reveal a child tether attached to a pouch which also serves to contain the tether when not in use.

OBJECTS OF THE INVENTION

It is therefore an object of the present invention to provide a belt worn pouch with a quick release of a stored child safety tether in situations where the child care provider must temporarily relinquish contact with the child's hand while using both adult hands to negotiate a commercial transaction.

It is also an object of the present invention to provide a dual use pouch for storing personal objects such as personal electronic devices, cell phones, credit cards and items of photographic identification while also providing a downward operable quick release lower compartment for quick release of a stored child's safety tether having a outer distal end portion wrapable around the wrist of the child while the adult child care provider uses both hands to negotiate commercial transactions at a bank, retail store or other public or private institutions.

Other objects which become apparent from the following description of the present invention.

SUMMARY OF THE INVENTION

This invention combines a belt-attached pouch with a child tether. The pouch not only serves its mundane function of storing objects such as cell phone, keys, sun glasses, and credit cards in its upper compartment, but it also serves to attach the child tether to the adult as well as storing it in a lower compartment when not in use. In an alternate embodiment, the pouch can have a separate exterior clip or ring to hold one or more keys. The pouch itself is fabricated of leather, vinyl, canvas, reinforced heavy twill or other materials or fabrics commonly used for the purpose of making pouches or purses. The pouch has a latched top cover over the object-containing compartment. The child tether is a short flat strap such as a nylon strap with an elastomeric center section of about 12 to 15 inches to permit a range of overall lengths from 18 to 24 inches when extended. One end is attached inside the lower storage compartment. The outer distal end has a hook and loop (VELCRO®) extension which is wrapped around the toddler's wrist when in use. The attachment to the pouch can be made permanent as by sewing or it can be attached otherwise inside the storage compartment to permit removal for cleaning. The lower storage compartment has a latched bottom-opening cover. The preferred latch for the lower compartment is magnetic.

In this manner, when approaching the area of use, the cover of the lower compartment is pulled open and the short child tether will fall out while its inner proximal end is securely attached to the pouch which itself is securely attached over the belt. Then the outer distal end of the child tether is quickly attached via Velcro around the child's wrist. This entire operation should not take longer than a few seconds. The toddler will be safely tethered to the adult at ground level with the ability to take a couple of steps or to sit or kneel on the ground. No adult hand is required to hold the tether, so both hands can be used to transact business.

In an alternate embodiment, the tether strap is replaced by a short length of self-retracting cord or cable similar to that which is often used on telephone handsets. This is a compact alternative that can be designed for long durability as well as very low pull for extension.

BRIEF DESCRIPTION OF THE DRAWINGS

The present invention can best be understood in connection with the accompanying drawings. It is noted that the invention is not limited to the precise embodiments shown in drawings, in which:

FIG. 5 is a side detail view in partial crossection showing one method of attachment of belt clip and tether to the pouch body.

FIG. 6 is a perspective view of an alternative tether incorporating a self-retracting cord.

DETAILED DESCRIPTION OF THE INVENTION

Figure 1:
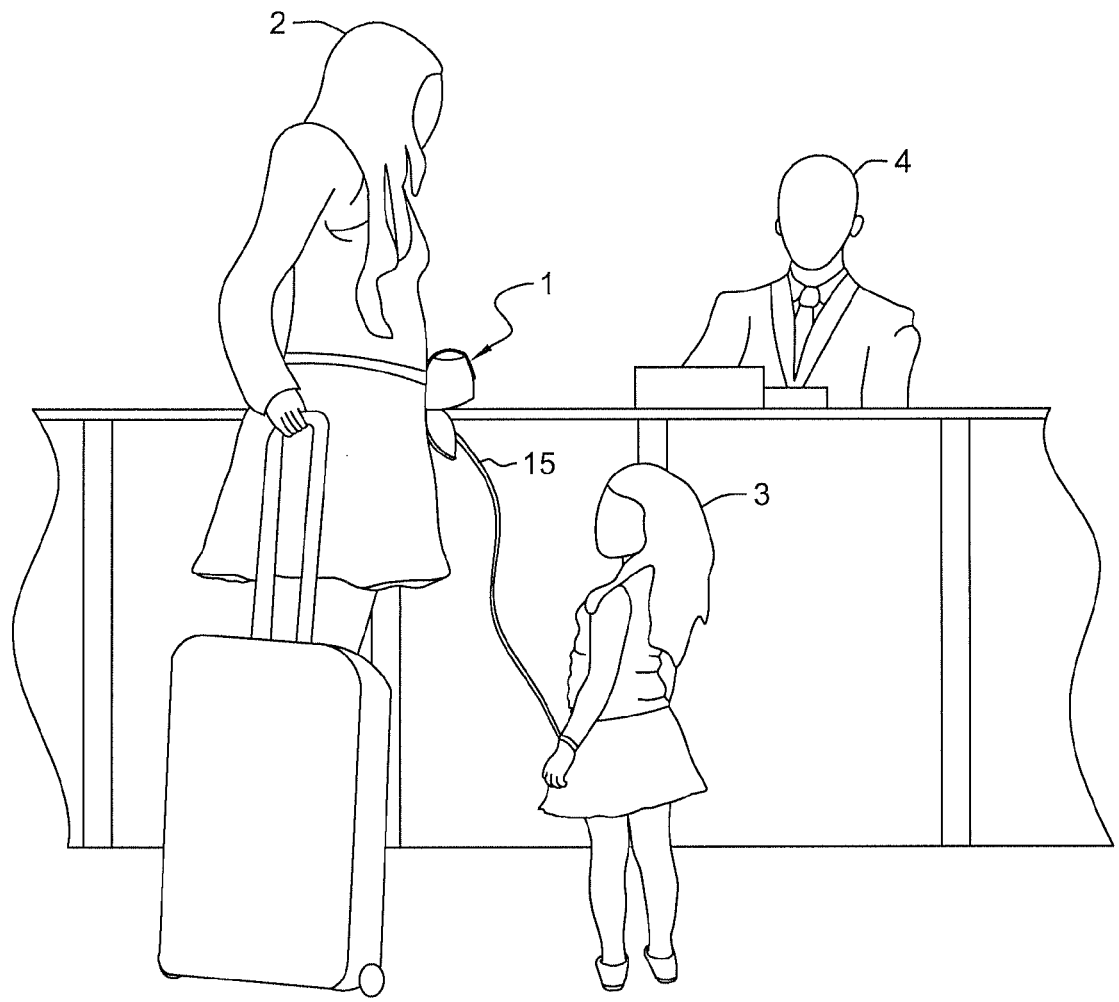
FIG. 1 is a side elevation of an adult tethered to a small toddler by use of the present invention.

FIG. 1 shows a typical use of this invention 1 by a woman 2 tethered to a toddler 3 by tether 15 attached to a belt-attached pouch. The scene depicts a transaction at a bank teller 4.

Figure 2:
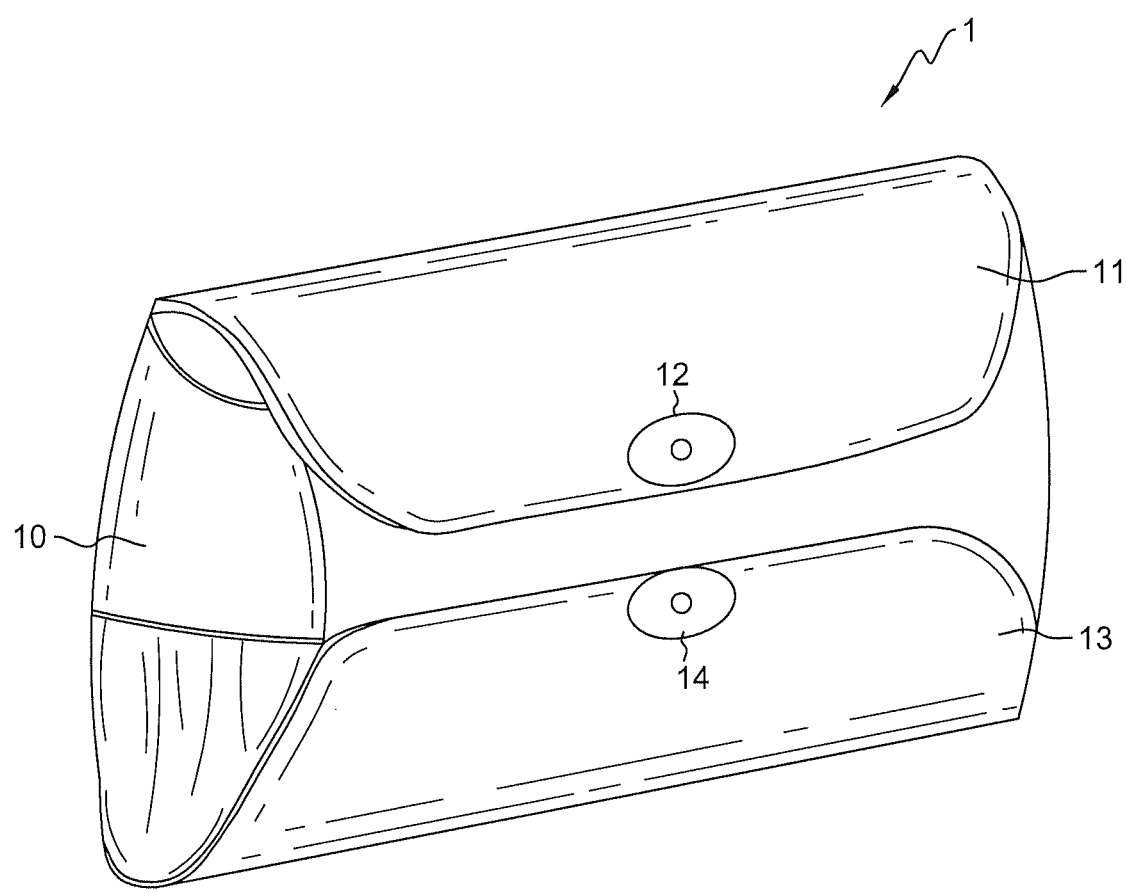
FIG. 2 is a perspective view of a pouch of this invention with both compartments closed and child tether stored in the lower compartment.

FIG. 2 shows the invention 1 as viewed with tether 15 stored within the bottom compartment of pouch 10 behind bottom-opening cover 13. Top cover 11 over bottom compartment 23 is also shown in the closed position. Top and bottom latches 12 and 14 respectively are also shown.

Figure 3:
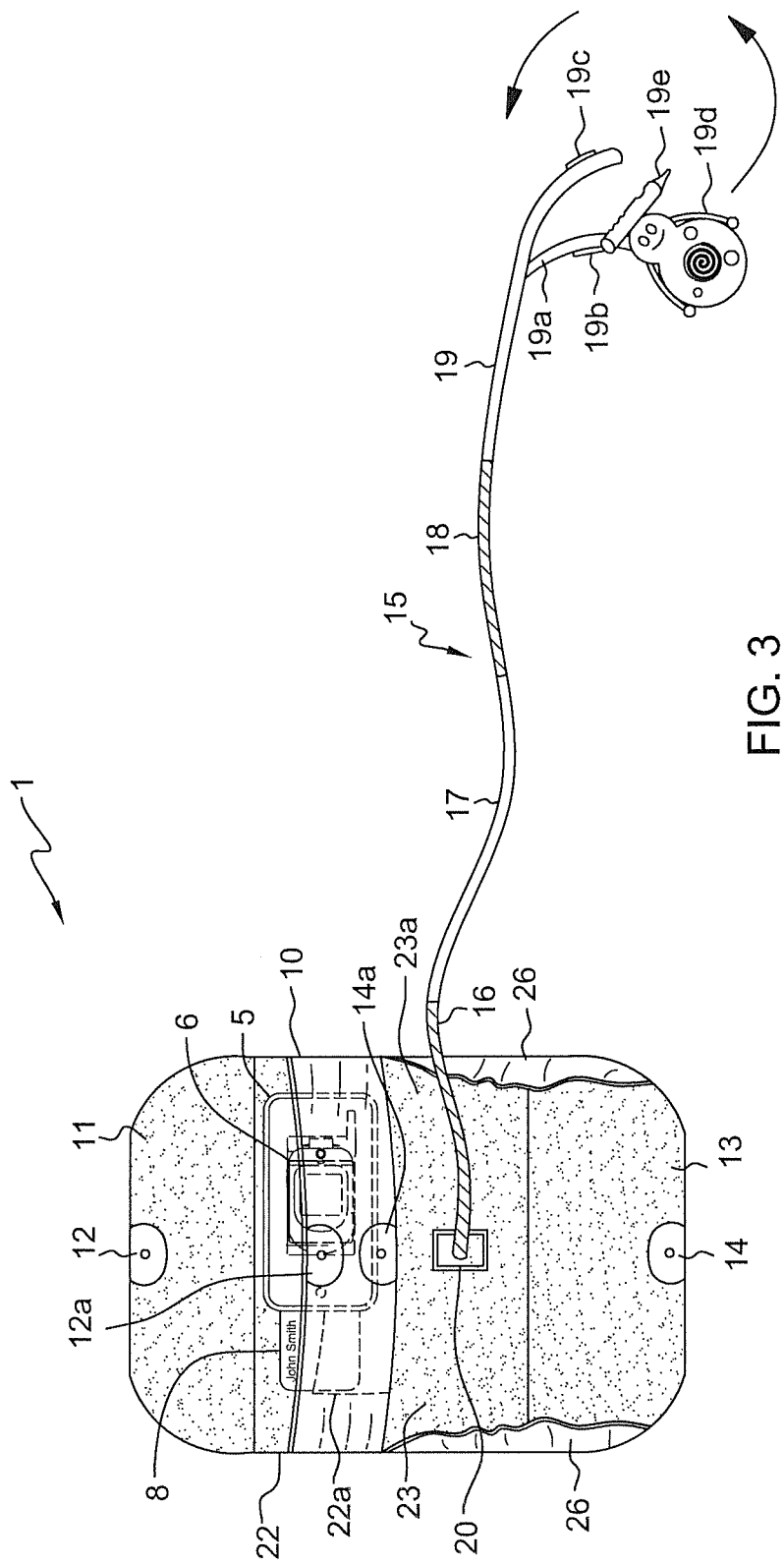
FIG. 3 is a front plan view of the pouch of this invention with both covers open and child tether extended.
Figure 4:
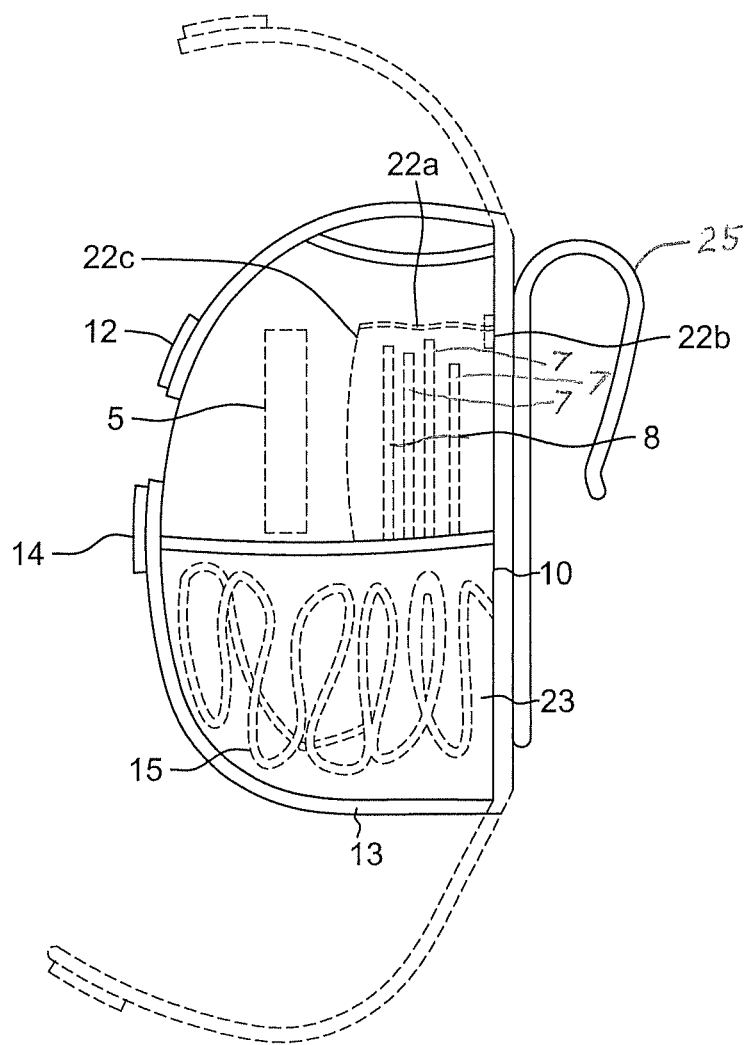
FIG. 4 is a side view of the closed pouch of this invention showing belt clip on back and indicating the open positions of both compartment covers in dashed lines.

FIGS. 3 and 4 show other details of invention 1 with pouch 10 covers 11 and 13 open and closed respectively. Note that latches 12 and 14 with strike plates 12A and 14A respectively are shown as magnetic latches. While latch 12 can conceivably be of a number of types such as snap or button types, latch 14 is preferably magnetic since it can be opened by pulling anywhere along the edge of bottom cover flap 13 without fumbling to conserve time in the critical period of quick attachment to the toddler. Note that tether 15 is a strap, and is preferably optionally comprised of inner proximal strap 16 which is shown permanently attached to pouch 10 back (by sewing at inner proximal end 20 to an inside surface 23a of bottom compartment 23), optional center elastomeric (stretchable) section 17 and outer distal section 18 of strap 15 ending in a child's wrist attachment 19, with an extension portion 19a having fasteners, such as reciprocal VELCRO® patches 19b, 19c which are looped around the toddler's wrist (in the direction of the arrows indicated) and secured. An amusement device 19d and/or 19e attachable to the wrist attachment 19 keeps the child occupied during use. The amusement device 19d can be a visual attraction, such as a pirate, mermaid or other cartoon image, or it can be a tangible object, such as an optional blowing tube whistle 19e for the child to blow and occupy his time.

Note the inside of the top compartment 22 is a preformed cavity that can hold a number of different objects 5, 6, 7 and 8.

As shown in FIGS. 3 and 4, these objects can include a touch screen smart phone 5, such as, for example, the Apple® iPhone5® smart phone, which has dimensions of about 4.87 inches in height, 2.31 inches in width and 0.30 inches in depth. Top compartment 22 can also hold a flip phone 6, such as the Casio® GZoneRavine2®, which is smaller in height (i.e. 4.33 inches) and width (i.e. 1.99 inches) but thicker in depth (i.e. 0.83 inches). The front view of FIG. 3 shows an outline of larger smart phone 5 in top sub-compartment 22c of top compartment 22, and an outline of smaller flip phone 6 superimposed over the outline of larger smart phone 5 in top sub-compartment 22c of top compartment 22. However, both phones 5 and 6 are shown for size comparison only. It is contemplated that preferably either smart phone 5 or flip phone 6 is held in the front part 22c of top compartment 22. Top compartment 22 can additionally hold a photo identification document 8, such as a motor vehicle driver's license and a plurality of credit cards 7 behind smart phone 5 in rear sub-compartment 22a of top compartment 22. Photo identification document 8 and credit cards 7 are typically each 3⅜ inch in long length, 2⅛ inch in width and 1 mm in thickness which, with a dozen credit cards 8, having a combined thickness of 12 mm, or 36/64 inches. Therefore the depth of top compartment 22 has to accommodate the height of the tallest smart phone 5 of about 5 inches, as well as the combined depth of a smaller but thicker flip phone 6 of almost an inch, plus the thickness of at least a dozen credit cards 8 and/or photo identification card 7 of al least ½ inch, for a minimal thickness of about an inch and a half, preferably about 2 inches in thickness. In order to keep the identification document 8 and plurality of cards 7 together, preferably sub-compartment 22c for phone 5 or 6 is provided as an elastic pocket, as well as an elastic pocket that can accommodate a tall but thinner smart phone 5 with a depth of about 0.30 inches or a thicker flip phone 6 of about 1 inch in depth.

Optionally, the cards 7 and identification document 8 can be provided in sub-compartment 22a in the form of an elastic pocket inside top compartment 22, which is optionally closeable by a Velcro® closure or a zipper 22b, or other closure.

Top compartment 22 has a bottom separating it from the lower tether storage compartment 23 below. Note that pleated sides 26 are shown at each side of bottom cover 13 attached to both the back of pouch 10 as well as cover 13. A different arrangement can extend the semi-rigid sides of pouch 10 covering the area 26 shown as pleated in FIG. 4; in that case, cover 13 would not be attached to these extended sides, but would just form around them for a loose side seal. In either case, tether 15 would be stored securely. If a single belt clip 25 is used it would be at the center of pouch 10 laterally. However, a pair of belt clips 25 can be used with one at each side of the back of pouch 10.

FIG. 5 is a detail of an attachment by fasteners 29 and 30 or sewing of belt clip 25 to pouch 10 back, which is shown in crossection. The bottom 28 of the top object compartment 22 is also shown. Belt clip 25 is attached by sewing or other fasteners to the rear exterior wall of pouch 10 right behind where the inner proximal end 32 of the strap portion 16 is attached at 20 to inside wall 23a. In an alternate manner, tether 15 can be removably attached from pouch 10 as for cleaning or replacement. Also, preferably the tether strap is attached by sewing or otherwise at inner proximal end 20 to inside surface wall 13a of bottom compartment 13. While belt clip 25 can be utilized on any garment such as a pair of pants or dress with a belt or waistband upon which the clip attaches, if a woman is wearing a waist less one piece dress, then an optional fabric belt can be utilized by inserting it within belt loop 40, which attached to pouch 1 near clip 25, so that pouch 1 can be attached to the auxiliary fabric belt.

FIG. 6 shows an alternate tether comprised of a short length of self-retracting cord 34 with inner proximal end 35 which, in turn, is sewn also into wall 23a of lower compartment 23. Cord 34 is bonded at its outer distal end to a short length of VELCRO® end 19 which is looped around the toddler's wrist and secured. Cord 24 stretches to the optimal lengths of 18 to 24 inches. But when retracted can have a short length of about 6-8 inches, which makes it easier to store. Cord 34 can be specially designed for this application or selected from the wide variety of electrical power or signal self-retracting cables available. Cables 34 are available with neoprene or polyurethane outer jackets. Alternatively, cord 34 can be a self-retracting plastic hose or flexible rod of similar shape; this alternative would be lighter in weight.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. A child's safety tether in combination with an attachment pouch providing for quick release of the stored child safety tether in situations where the child care provider must temporarily relinquish contact with the child's hand while using both adult hands to negotiate a commercial transaction, comprising:

said pouch having a vertically extending inner wall, a vertically extending outer wall spaced from said inner wall, and side walls for forming an enclosure between said inner and outer walls;

a horizontally extending wall within said enclosure forming an upper compartment and a lower compartment within said pouch;

a top opening into said upper compartment with a closure for opening and closing access to said upper compartment;

a bottom opening into said lower compartment with a flap having one side attached to a bottom edge said inside wall and a free end for overlapping said outer wall for closing and opening said lower compartment, with a quick release fastener for attaching said free end to said outer wall, whereby releasing said fastener will open up said lower compartment to permit contents within said lower compartment to drop out from said lower compartment by way of gravity;

a child safety tether including a flexible strap having a distal end with a child wrist attachment and a proximal end attached to an inside surface of said inner wall within said lower compartment, whereby said tether remains coiled up within said lower compartment when said flap is closed;

whereby upon quick release of said flap said tether drops out of said lower compartment permitting rapid deployment of said wrist attachment of said tether with provision to distract said child.

2. The child's safety tether with an attachment pouch as in claim 1 wherein said upper compartment provides storage for personal items.

3. The child's safety tether with an attachment pouch as in claim 1 wherein an amusement device is attached to said wrist attachment for distracting the child while the wrist attachment is on the wrist of the child.

4. The child's safety tether with an attachment pouch as in claim 3 wherein mounting apparatus is attached to an outside surface of said inner wall.

5. The child's safety tether with an attachment pouch as in claim 4 wherein said flexible strap is stretchably elastomeric.

6. The child's safety tether with an attachment pouch as in claim 4 wherein said flexible strap has at least two non-stretchable flexible portions and a stretchably elastomeric central portion located therebetween.

7. The child's safety tether with an attachment pouch as in claim 4 wherein said flexible strap is a self-retracting cord.

8. The child's safety tether with an attachment pouch as in claim 4 wherein said quick release fastener is a magnetic fastener.

9. The child's safety tether with an attachment pouch as in claim 4 wherein said quick release fastener comprises snap button fasteners.

10. The child's safety tether with an attachment pouch as in claim 4 wherein said side walls are pleated.

11. The child's safety tether with an attachment pouch as in claim 4 wherein said child's safety tether is removably attached to said lower compartment of said pouch.

12. A method of restraining a child temporarily comprising the steps of:

a user wearing a pouch having a vertically extending inner wall, a vertically extending outer wall spaced from said inner wall, side walls forming an enclosure between said inner and outer walls, a horizontally extending wall within said enclosure forming an upper compartment and a lower compartment within said pouch, a top opening into said upper compartment with a closure for opening and closing access to said upper compartment, a bottom opening into said lower compartment with a flap having one side attached to a bottom edge said inside wall and a free end for overlapping said outer wall for closing and opening said lower compartment, with a quick release fastener for attaching said free end to said outer wall, whereby releasing said fastener will open up said lower compartment to permit contents within said lower compartment to drop out from said lower compartment by way of gravity;

attaching a proximal end of a child safety tether to an inside surface of said inner wall within said lower compartment;

securing said tether inside of said lower compartment by closing said flap with said quick release fastener;

deploying said tether to restrain said child by releasing said fastener to allow said flap to open, allowing said tether to drop out of said lower compartment with the proximal end of the tether attached to said inner wall;

using a wrist attachment on a distal end of said tether to secure the distal end to a wrist of said child; and mounting an amusement device on said wrist attachment for distracting the child while the wrist attachment is on the child.

13. The method of claim 12 in which said amusement device includes a whistle for use by said child.

14. The method of claim 12 further comprising the step of mounting an amusement device on said wrist attachment for distracting the child while the wrist attachment is on the wrist of the child.

\* \* \* \* \*